United States Patent [19]

Itoh et al.

[11] Patent Number: 5,746,589
[45] Date of Patent: May 5, 1998

[54] PHOSPHOR HEAT-TRANSFER METHOD AND APPARATUS THEREFOR

[75] Inventors: Shigeo Itoh; Yoshihisa Yonezawa; Hitoshi Toki; Yoshitaka Satoh, all of Mobara, Japan

[73] Assignee: Futaba Denshi Kogyo Kabushiki Kaisha, Chiba-ken, Japan

[21] Appl. No.: 439,272

[22] Filed: May 11, 1995

[30] Foreign Application Priority Data

May 11, 1994 [JP] Japan ................................. 6-097585

[51] Int. Cl.⁶ ............................................. F27D 15/02
[52] U.S. Cl. .......................... 432/77; 432/152; 432/241
[58] Field of Search ......................... 432/152, 85, 241, 432/77

[56] References Cited

U.S. PATENT DOCUMENTS

| | | | |
|---|---|---|---|
| 4,857,228 | 8/1989 | Kabay et al. | 252/301.4 S |
| 5,249,960 | 10/1993 | Monoe | 432/77 |
| 5,273,423 | 12/1993 | Shiraiwa | 432/241 |
| 5,288,227 | 2/1994 | Righetti | 432/85 |
| 5,328,360 | 7/1994 | Yokokawa | 432/241 |
| 5,421,723 | 6/1995 | Katz | 432/85 |

*Primary Examiner*—Weilun Lo
*Attorney, Agent, or Firm*—Hazel & Thomas

[57] ABSTRACT

A phosphor heat-treating method and an apparatus therefor capable of providing a phosphor exhibiting improved crystallizability and increased in concentration of a luminous center therein. A phosphor is heated and rapidly cooled in atmosphere gas of a predetermined pressure. The pressure substantially restrains decomposition and scattering of the phosphor during heating and cooling of the phosphor.

10 Claims, 7 Drawing Sheets

PHOSPHOR HEAT-TRANSFER METHOD AND APPARATUS THEREFOR

BACKGROUND OF THE INVENTION

This invention relates to a phosphor heat-treating method and an apparatus therefor.

A method for preparing a phosphor which is constructed so as to dope a crystal matrix of a phosphor with an additive acting as a luminous center of the phosphor by physical techniques such as heat diffusion or ion implantation has been conventionally known in the art. After the doping, the phosphor is subject to a heat treatment in order to improve crystallizability of the phosphor. The heat treatment is generally carried out by heating the phosphor to an elevated temperature, followed by gradual cooling of the phosphor at a cooling rate or speed of 50° C./hr.

The conventional method of doping a crystal matrix of a phosphor with an additive by physical techniques and, in particular, by ion implantation has a disadvantage of causing lots of lattice defects to occur on a surface of the crystal matrix. In order to eliminate the lattice defects, the heat treatment is carried out under a normal pressure. However, the heat treatment causes decomposition and scattering (sublimation) of the phosphor with an increase in temperature, to thereby vary composition of the phosphor, leading to disadvantages such as a decrease in luminance and the like. Also, although the heat treatment is generally effective with an increase in temperature, an excessive increase in temperature causes the composition of the phosphor, to thereby end with the opposite results. For example, a heat treatment of a Zn-S phosphor at 1000° C. leads to sublimation of the phosphor to cause chapping of a surface thereof, resulting in a crystal matrix of the phosphor being damaged. Also, a low-velocity electron excited phosphor generally has a luminous region formed into a depth of 2500 Å from a surface thereof. Annealing of the low-velocity electron excited phosphor at a cooling rate conventionally employed causes an activator to deeply enter the phosphor beyond the luminous region by thermal diffusion, to thereby fail to concentratedly dope a surface region of a crystal matrix of the phosphor with the activator.

SUMMARY OF THE INVENTION

The present invention has been made in view of the foregoing disadvantage of the prior art.

Accordingly, it is an object of the present invention to provide a phosphor heat-treating method which is capable of increasing a concentration of a luminous center in a phosphor while ensuring satisfactory crystallizability of the phosphor.

It is another object of the present invention to provide a phosphor heat-treating apparatus which is capable of permitting a concentration of a luminous center in a phosphor to be significantly increased while ensuring satisfactory crystallizability of the phosphor.

In accordance with one aspect of the present invention, a phosphor heat-treating method is provided. The method comprises the step of placing a crystal phosphor in a closed vessel. The crystal phosphor has a crystal matrix doped with an activator. Also, the method further comprises the steps of introducing atmosphere gas into the vessel to set a pressure in the vessel within a range of $5 \times 10^6$ to $1 \times 10^9$ Pa, heating the phosphor to a temperature of 900° to 1300° C., and rapidly cooling the phosphor at a cooling speed of 100° C./sec or more.

In a preferred embodiment of the present invention, doping of the activator into the crystal matrix of the phosphor is carried out by ion implantation.

In a preferred embodiment of the present invention, the atmosphere gas may be a rare gas. Alternatively, the atmosphere gas may be a mixture of a rare gas and a gas selected from the group consisting of $H_2$, $H_2S$, $O_2$ and $N_2$.

In accordance with another aspect of the present invention, a phosphor heat-treating apparatus is provided. The apparatus includes a closed vessel constructed so as to hold atmosphere gas of a pressure of $5 \times 10^6$ to $1 \times 10^9$ Pa therein, a heating means for heating a phosphor received in the vessel, and a processing means for rapidly cooling the heated phosphor at a cooling speed at 100° C./sec or more.

In a preferred embodiment of the present invention, the apparatus may further include a transfer means for moving the phosphor between said heating means and said processing means.

In a preferred embodiment of the present invention, the heating means may be arranged outside said closed vessel. Also, the cooling means may be arranged outside said closed vessel.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, a phosphor heat-treating method according to the present invention will be described hereinafter with reference to the following examples. In each of the examples, a phosphor was rapidly heated in atmosphere gas of a predetermined pressure and then rapidly cooled therein. Such a heat treatment permitted doping of a luminous center in the phosphor to be fully accomplished while ensuring satisfactory crystallizability of the phosphor and without causing decomposition and scattering of the phosphor.

EXAMPLE 1

Manufacturing of $ZnGa_2O_4$ was practiced by subjecting ZnO and $Ga_2O_3$ to primary calcination at a temperature of 1300° C. in an oxidizing atmosphere. Then, secondary calcination was carried out under the following conditions. More particularly, a gas atmosphere was formed in a closed vessel by mixing Ar which is an example of rare gas belonging to inert gas with 20 vol % of $H_2$. A pressure of the atmosphere was set at $2 \times 10^7$ Pa. Then, the phosphor was kept at a heating temperature of 1100° C. for 1 hour and then rapidly cooled to 500° C. at a cooling speed of 120° C./sec for 5 seconds. The phosphor was improved in luminous characteristics without scattering of Zn.

EXAMPLE 2

For manufacturing of a $ZnGA_2O_4$:Mn phosphor, secondary calcination for doping a matrix of the with Mn by thermal diffusion was carried out under the following conditions. A gas atmosphere was prepared by mixing inert gas Ar with 5 vol % of $H_2$. A pressure of the gas atmosphere was set to be $2 \times 10^7$ Pa. The phosphor was kept at a heating temperature of 1100° C. for 1 hour and then cooled at 500° C. at a cooling speed of 120° C./sec for 5 minutes. Doping of Mn was satisfactorily carried out without scattering of Zn and Mn as compared with the prior art, resulting in luminous characteristics of the phosphor being improved.

EXAMPLE 3

A ZnS:Ag, Cl phosphor obtained by doping a ZnS phosphor matrix with Ag and Cl by thermal diffusion was maintained at 900° C. for 1 hour in an Ar atmosphere having a pressure of $9 \times 10^6$ Pa and then cooled to 500° C. for 5 seconds. This resulted in crystallizability of the phosphor being increased to a degree sufficient to significantly improve luminous characteristics of the phosphor.

EXAMPLE 4

Figure 1:
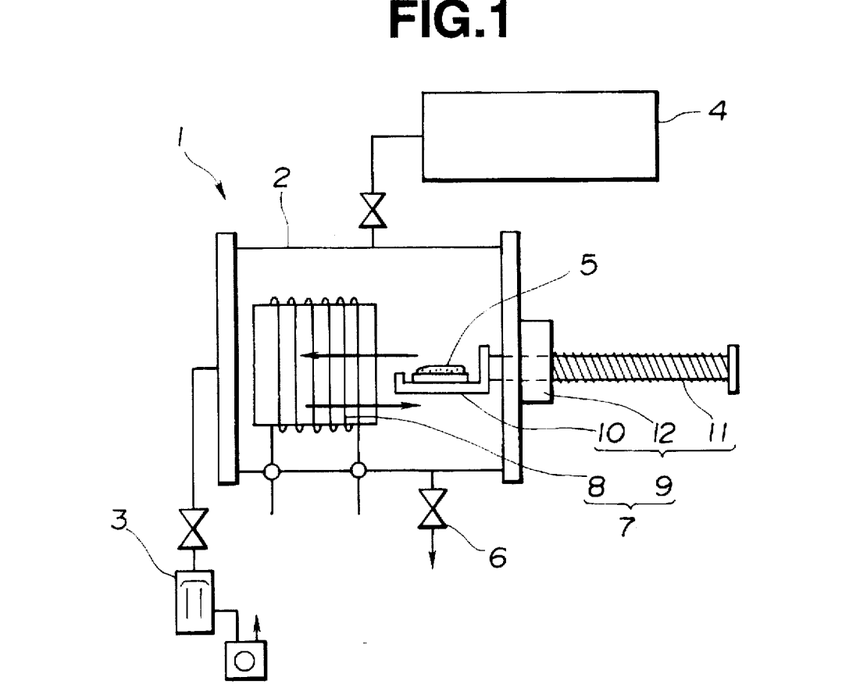
FIG. 1 is a schematic front elevation view showing a first embodiment of a phosphor heat-treating apparatus according to the present invention.

$ZnGa_2O_4$ which is a crystal matrix of a phosphor was doped with Mn acting as an activator by ion implantation. For this purpose, the crystal matrix $ZnGa_2O_4$ was pasted and was coated on a Si substrate by printing. The substrate may be made of metal, glass, ceramic or the like in place of Si. However, it is required that the crystal matrix of the phosphor is arranged on an electrode made of a conductive film or the like and disposed on the substrate. The coating may be carried out by electro-deposition, spraying, photoresist or the like in place of printing. The, the substrate on which $ZnGa_2O_4$ was deposited was placed in an ion implantation unit. In the example, implantation energies of 150 keV, 90 keV and 30 keV were employed. Ion implantation was carried out in order from the highest implantation energy. The dosage of Mn or the amount of Mn implanted was $2 \times 10^{15}/cm^2$ for every implantation and therefore $5 \times 10^{15}/cm^2$ in all. An ion current was set to be 1 to 100 μA for implantation. After the luminous center was thus doped in the phosphor by ion implantation, an annealing treatment was carried out for remedying defects occurring in the phosphor during activation of the luminous center and ion implantation. The annealing was executed using an annealing unit shown in FIG. 1. The annealing was carried out by holding the phosphor in an Ar atmosphere at a temperature of 1300° C. and a pressure of $1 \times 10^8$ Pa for 3 minutes. The annealing unit shown in FIG. 1 is suitable for both rapid heating and rapid cooling. Alternatively, any one of annealing units shown in FIGS. 2 to 9 may be conveniently used for this purpose. Also, $N_2$, $O_2$ or the like may be preferably used as an atmosphere for the annealing in place of Ar. The annealing condition described above may be varied depending on a crystal matrix of a phosphor to be treated, an impurity to be doped, implantation conditions and the like.

Figure 10:
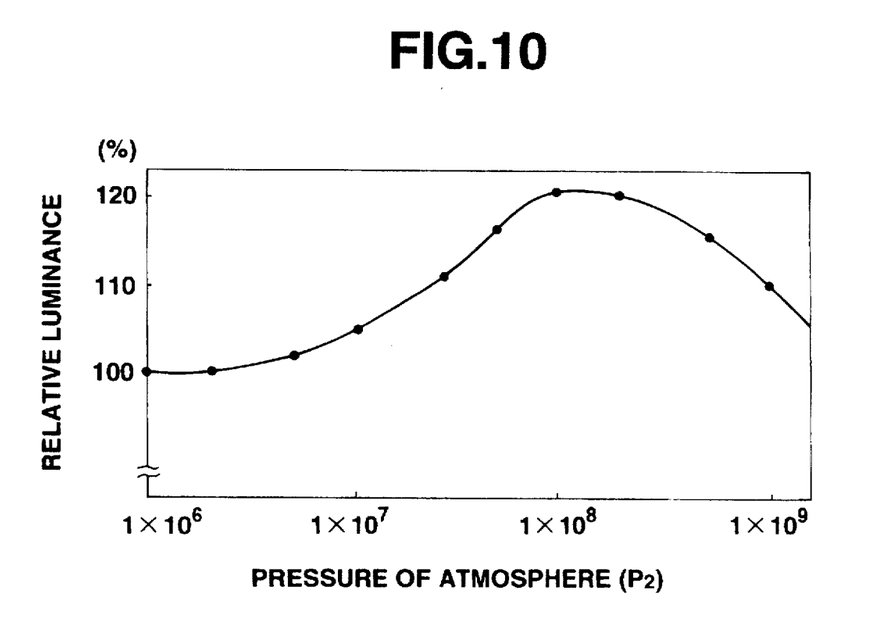
FIG. 10 is a graphical representation showing relationship between a pressure of atmosphere gas in a heat treatment and a relative luminance of a phosphor heat-treated.

In addition to Examples 1 to 4 described above, the inventors made various experiments while varying conditions. FIG. 10 shows results of the experiments. More particularly, FIG. 10 shows relationship between a pressure of atmosphere gas used in the heat treatment and relative luminance of a phosphor heat-treated. The relative luminance is indicated on the assumption that luminance of a specimen obtained by subjecting it to a heat treatment under an atmospheric pressure is 100%.

As shown in FIG. 10, a decrease in pressure of atmosphere gas causes the relative luminance to be reduced because it fails to prevent decomposition of the phosphor, whereas an increase in the pressure to a certain degree leads to damage to crystallizability of the phosphor, to thereby somewhat decrease the luminance. Thus, as will be noted from the results of FIG. 10, the phosphor heat-treating method of the present invention accomplishes an improvement in luminance of the phosphor when a pressure of the atmosphere gas is $2 \times 10^8$ Pa or more. In particular, satisfactory results are obtained when the pressure is between $5 \times 10^6$ Pa and $1 \times 10^9$ Pa and more satisfactory results are obtained when the pressure is between $5 \times 10^7$ Pa and $5 \times 10^8$ Pa. Also, so noted from Example 4, the pressure of $1 \times 10^8$ Pa is most effective to subject the phosphor to a doping treatment by ion implantation. Now, the reason why an increase in pressure of the atmosphere gas contributes to an increase in luminance of the phosphor will be described. As a result of a careful study on the fact that lots of lattice defects occur on a surface of the crystal matrix which has been subject to ion implantation, the inventors took notice of the fact that when an annealing treatment of the crystal matrix under a normal pressure is carried out for remedying the lattice defects, decomposition of the phosphor and scattering thereof due to sublimation are caused with an increase in temperature, to thereby vary composition of the phosphor, leading to a decrease in luminance of the phosphor. The remedy proceeds with an increase in temperature of the heat treatment, however, an excessive increase of the temperature causes decomposition of the phosphor as described above. Such decomposition and scattering of the phosphor are restrained by adjustment of a pressure of the atmosphere gas, to thereby provide the phosphor with satisfactory crystallizability.

In the examples described above, rare gas was used for providing an inert gas atmosphere. Alternatively, the atmosphere gas may be formed using various kinds of non-reactive gases including a neutral gas such as $N_2$ or the like.

Now, a phosphor heat-treating apparatus which may be conveniently used for the phosphor heat-treating method of the present invention will be described hereinafter with reference to FIGS. 1 to 9, wherein like reference numerals designate corresponding parts throughout.

Referring first to FIG. 1, a first embodiment of a phosphor heat-treating apparatus according to the present invention is illustrated. A phosphor heat-treating apparatus of the illustrated embodiment generally designated at reference numeral 1 includes a cylindrical vessel 2 which is so arranged that an axis thereof extends in a horizontal direction. The vessel 2 has an evacuation unit 3 for evacuating the vessel 2 to a high vacuum and an atmosphere gas feed unit 4 for feeding the vessel 2 with inert gas acting as atmosphere gas connected thereto. In the vessel 2 is received a specimen 3 which is a phosphor to be heat-treated. The vessel 2 also has a regulator valve 6 connected thereto.

The vessel 2 is provided therein with a processing means 7 for heating the phosphor specimen 5 placed in the vessel 2 and then cooling it. The processing means 7 includes a heater 8 arranged in proximity to one end of the vessel 2 and acting as a heating means and a transfer means 9 for accessing the phosphor specimen to the heater 8.

The heater 8 comprises a heating wire wound in the form of a spiral shape. The transfer means 9 includes a tray 10 on which the phosphor specimen 5 is carried. The tray 10 is moved in an axial direction of the vessel 2 by means of a combination of a feed screw 11 arranged so as to project from the vessel 2 and a feed nut 12 threadedly engaged with the feed screw 11. The transfer means 9 thus constructed permits the phosphor specimen 5 to be freely moved between the heater 8 and a position in the vessel 2 in proximity to the other end of the vessel 2 which is not affected by heat of the heater 8, as desired.

Now, the manner of operation of the phosphor heat-treating apparatus of the illustrated embodiment constructed as described above will be described hereinafter.

First, the phosphor specimen 5 is placed on the tray 10 arranged in the vessel 2 and evacuation of the vessel 2 is carried out by means of the evacuation unit 3. Then, the vessel 2 is fed with suitable atmosphere gas through the atmosphere gas feed unit 4 to increase a pressure in the vessel 2 to a predetermined level. Subsequently, the heater 8 is operated so as to provide a predetermined heating temperature, followed by movement of tray 10 in the heater 8 to rapidly heat the specimen 5 to a predetermined temperature and keep it at the temperature. Thereafter, the tray 10 on which the specimen 5 is put is removed from the heater 8 to rapidly cool the specimen 5.

Figure 2:
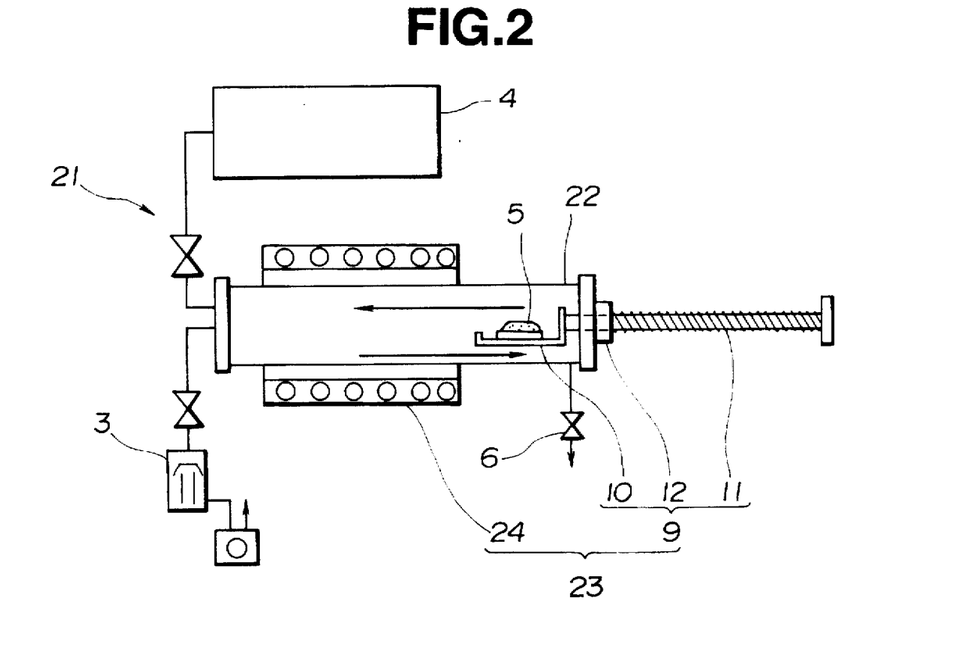
FIG. 2 is a schematic front elevation view showing a second embodiment of a phosphor heat-treating apparatus according to the present invention.

Referring now to FIG. 2, a second embodiment of a phosphor heat-treating apparatus according to the present invention is illustrated. A phosphor heat-treating apparatus of the second embodiment which is generally designated at reference numeral 21 includes a cylindrical vessel 22 constructed in substantially the same manner as the vessel 2 in the first embodiment described above.

The apparatus 21 includes a processing unit 23 for heating a phosphor specimen 5 received in the vessel 22 and then cooling it. The processing unit 23 includes a heating unit 24 arranged on an outside of the vessel 22 to heat an inner region of the vessel 22 defined in proximity to one end of the vessel 22. Also, the processing means 23 includes a transfer means 9 for moving or transferring the phosphor specimen 5 between a region in the vessel 22 which is heated by the heating unit 24 and a non-heated region therein. The heating unit 24 may be an ordinary heating-type heater. Alternatively, it may be a lamp heater. The transfer means 9 may be constructed in substantially the same manner as in the first embodiment described above.

The apparatus of the second embodiment permits the phosphor specimen 5 to be rapidly heated and cooled as in the first embodiment.

Referring now to FIGS. 3(a) to 4(b), a third embodiment of a phosphor heat-treating apparatus according to the present invention is illustrated. A phosphor heat-treating apparatus of the third embodiment designated at reference numeral 31 likewise includes a cylindrical vessel 32 constructed as in the first embodiment. However, the vessel 32 is not provided therein with any heating means and transfer means, unlike the first and second embodiments described above, although it is constructed so as to receive a phosphor specimen 5 therein while putting it on a tray 33.

Figure 3A:
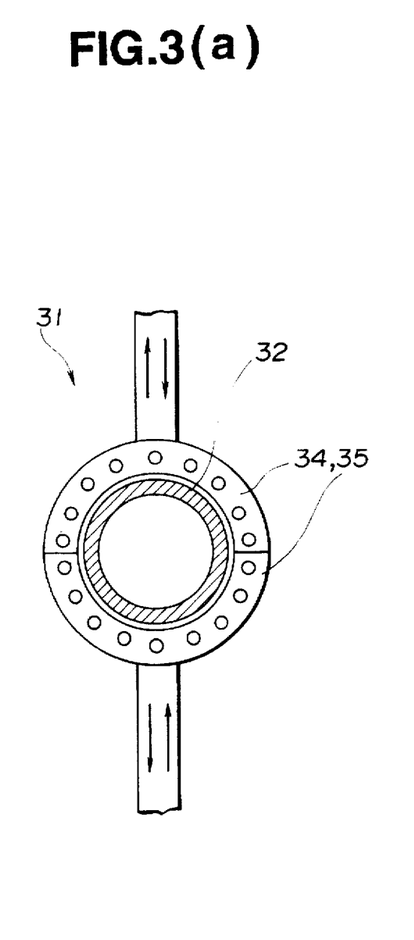
FIG. 3(a) is a schematic front elevation view in section showing a third embodiment of a phosphor heat-treating apparatus according to the present invention.
Figure 3B:
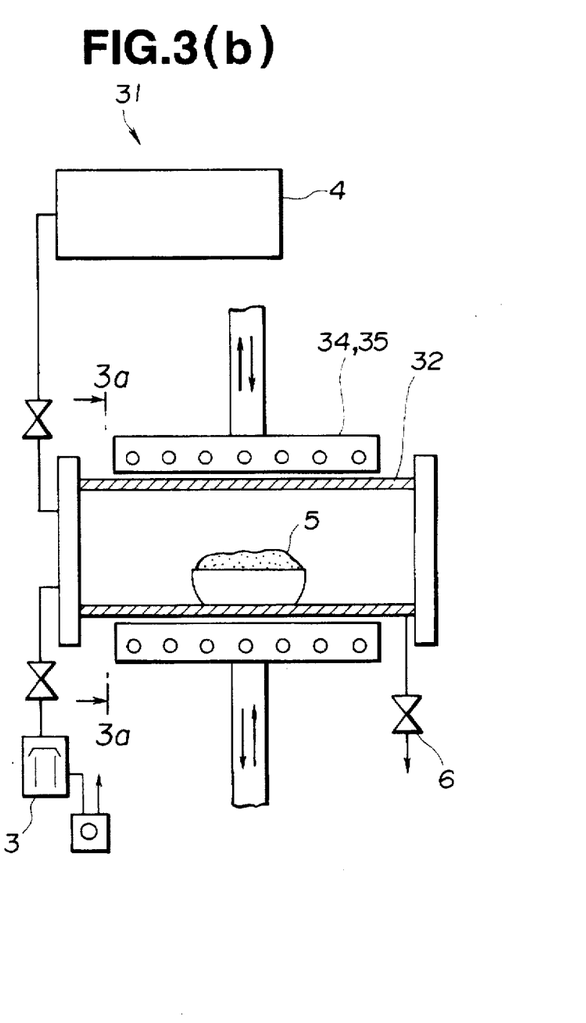
FIG. 3(b) is a sectional view taken along line 3a—3a of FIG. 3(a)

In the apparatus 31 of the third embodiment, a processing means 34 for heating the phosphor specimen 5 received in the vessel 32 and then cooling it is arranged outside the vessel 32. The processing means 34 includes a heating unit 35 arranged outside the vessel 32 to heat an interior of the vessel 32 from an outside of the vessel 32 and a cooling unit 36 likewise arranged outside the vessel 32 to cool the interior of the vessel 32 from the outside of the vessel.

Figure 4A:
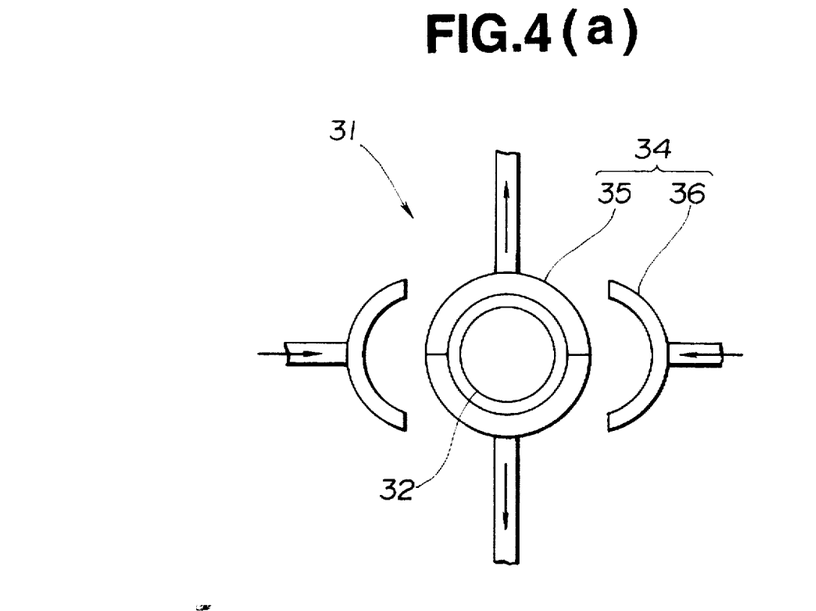
FIGS. 4(a) and 4(b) each are a side elevation view showing a function of the phosphor heat-treating apparatus of FIG. 3(a)
Figure 4B:
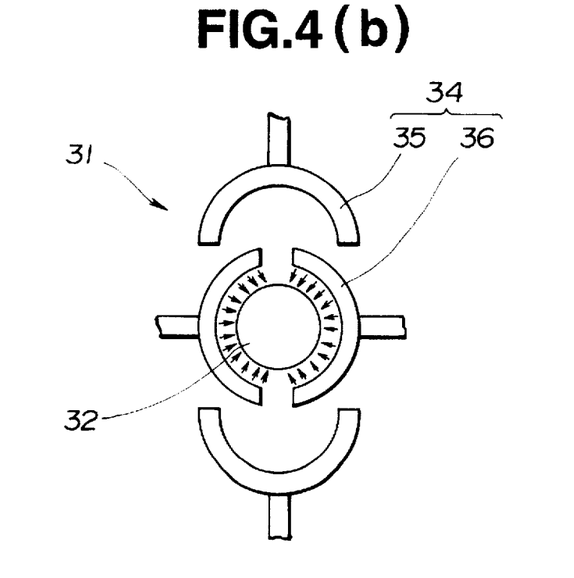

The heating unit 35 may comprise an ordinary heating type heater. Alternatively, it may comprise a lamp heater. The heating unit 35 is formed into a cylindrical configuration and dimensions which permit the vessel 32 to be received therein. For this purpose, the heating unit 35 may comprise two halves equally divided about an axis thereof. As shown in FIGS. 4(a) and 4(b), the halves are constructed so as to be vertically moved by means of a suitable driving means (not shown) and combined together so as to surround the vessel 32 as required for heating it.

The cooling unit 36 may comprise, for example, a fan for cooling the interior of the vessel 32 by air blowing. The cooling unit 36 is likewise formed into a cylindrical shape and dimensions which permit the vessel 32 to be received herein and comprises two halves equally divided about an axis thereof. The halves, as shown in FIGS. 4(a) and 4(b), are laterally moved using a driving means (not shown), resulting in being combined together to surround the vessel 32 for cooling it as required.

Heating of the specimen 5 in the vessel 32 is carried out by combining the halves together to form the heating unit 35 to surround the vessel 32, to thereby rapidly heat the interior of the vessel 32. Upon heating of the specimen phosphor 5, the heating unit 35 is vertically separated into the two halves. Then, the halves of the cooling unit 36 laterally separated from each other are combined together to form the cooling unit 36 while surrounding the vessel 32, resulting in the interior of the vessel 32 being rapidly cooled. When the cooling unit 36 comprises a fan, a decrease in temperature of air fed by the fan further promotes cooling of the vessel 32. Thus, the third embodiment likewise accomplishes rapid heating and cooling of the phosphor specimen 5 as in the first and second embodiments.

Figure 5:
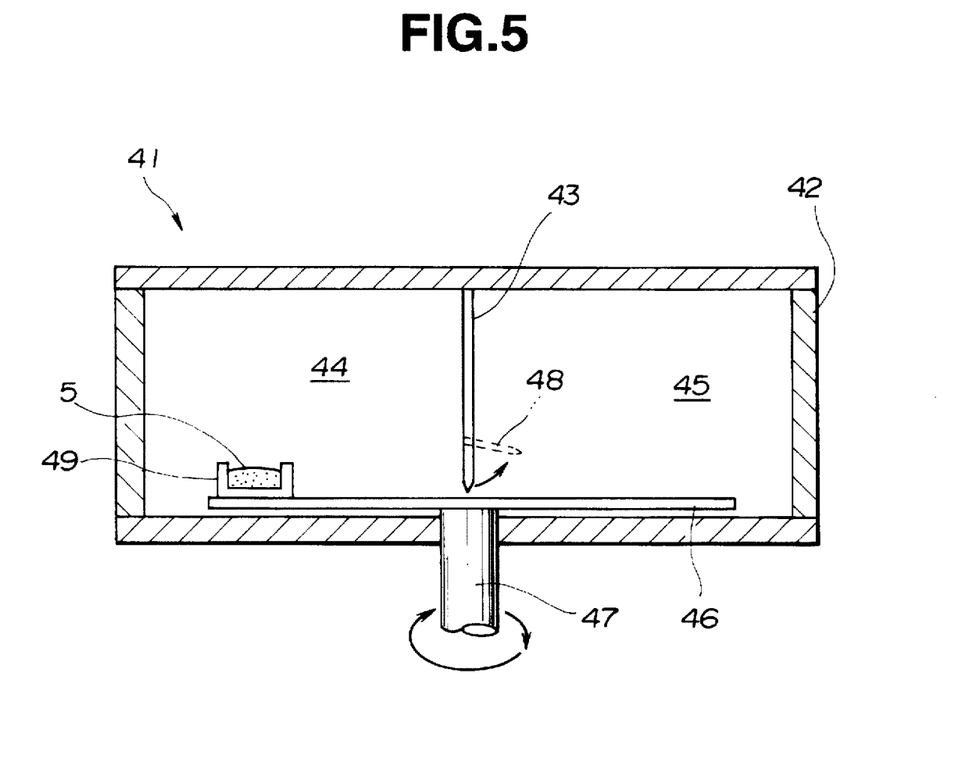
FIG. 5 is a front elevation view in section showing a fourth embodiment of a phosphor heat-treating apparatus according to the present invention.
Figure 6A:
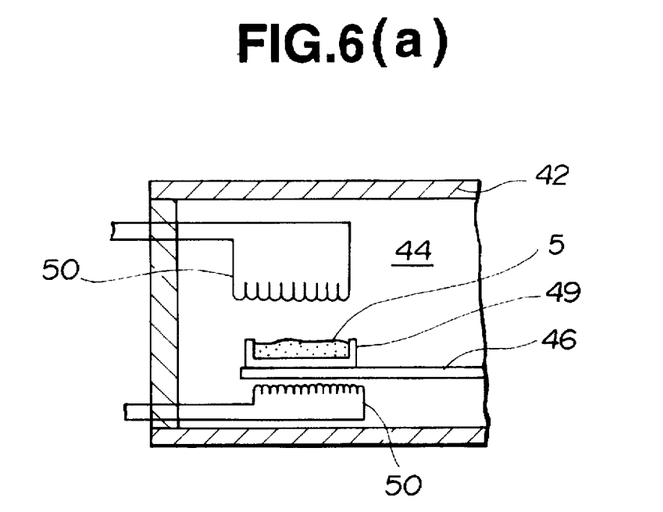
FIGS. 6(a) and 6(b) each are a fragmentary sectional view showing a modification of a heating section of the phosphor heat-treating apparatus shown in FIG. 5.
Figure 6B:
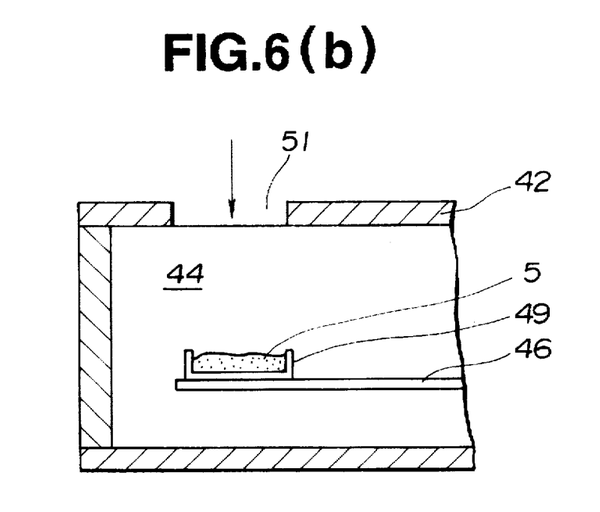
Figure 7:
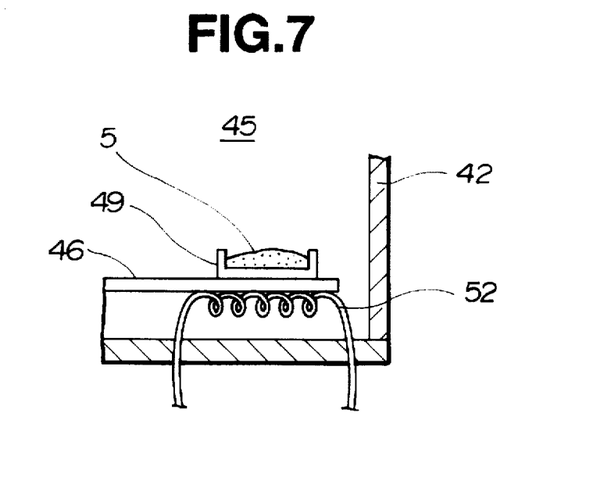
FIG. 7 is a fragmentary sectional view showing a modification of a cooling section of the phosphor heat treating apparatus shown in FIG. 5.

Referring now to FIGS. 5 to 7, a fourth embodiment of a phosphor heat treating apparatus according to the present invention is illustrated, which is generally designated at reference numeral 41. The phosphor heat-treating apparatus 41 includes a hollow disc-like vessel 42. The vessel 42 is provided with an evacuation unit (not shown) for evacuating an interior of the vessel 42 to a high vacuum and an atmosphere gas feed unit (not shown) for feeding the vessel 42 with inert gas for providing atmosphere gas. In the vessel 42 is received a phosphor specimen 5 to be heat-treated.

The interior of the vessel 42 is divided into a heating section 44 and a cooling section by means of a partition 43. The heating section 44 is adapted to permit the phosphor specimen 5 received in the vessel 42 to be heated therein using a heating means arranged inside or outside the vessel 42. The cooling section 45 is adapted to permit the phosphor specimen 5 to be cooled therein using a cooling means arranged inside or outside the vessel 42.

The vessel 42 is provided therein with a disc-like rotation plate 46 in a manner to be in proximity to a lower portion of the vessel, which rotation plate 46 is formed into a shape corresponding to an inner configuration of the vessel 42 and arranged so as to act as a transfer means for the phosphor. The rotation plate 42 is mounted on a lower surface thereof with one end of a rotation shaft 47 so as to downwardly extend therefrom. The rotation shaft 47 is arranged so as to airtightly extend through a bottom plate 42a of the vessel 42 and connected at the other end thereof to a driving means (not shown) arranged outside the vessel 42. Actuation of the driving means permits the rotation plate 46 to be rotated in the vessel 42, to thereby move the phosphor specimen 5 on a tray 49 supported on the rotation plate 46 between the heating section 44 and the cooling section 45.

The partition 43 is provided at a lower portion thereof with a door 48. When the tray 49 on which the phosphor 5 is put is moved with rotation of the rotation plate 46, resulting in being struck against the door 48 of the partition 43, it forces the door 48 to open it. Alternatively, an operation means may be provided to operate the door 48 depending on movement of the tray 49 with rotation of the rotation plate 46.

The heating means may comprise an ordinary heating-type heater 50 arranged in the vessel 42 as shown in FIG. 6(a). Alternatively, it may comprise a laser irradiating means or a lamp heater which may be arranged so as to heat the specimen 5 in the vessel 42 from an outside of the vessel through an irradiation window 51 of the vessel 42.

The cooling means, as shown in FIG. 7, may comprise a cooling unit 52 arranged in the vessel 42 and fed with a cooling medium such as cooling water, liquid nitrogen or the like from an outside of the vessel 42. Alternatively, it may comprise a fan arranged outside the vessel 42 so as to cool the specimen 5 in the vessel 42 through a wall of the vessel 42. The cooling section 45 may be provided with a Peltier element for measuring a temperature in the cooling section.

In the apparatus of the fourth embodiment constructed as described above, the specimen 5 is put on the tray 49 in the vessel 42 and the vessel 42 is evacuated through the evacuation unit, followed by feeding of non-reactive atmosphere gas to the vessel 42 by means of the atmosphere gas feed unit to increase a pressure in the vessel to a predetermined level. Then, the heating means is operated and the tray 49 having the specimen 5 put thereon is moved to the heating section 44, so that the specimen 5 may be rapidly heated. After the phosphor specimen 5 is heated at a predetermined temperature for a predetermined or required period of time, the rotation plate 46 is rotated to move the tray 49 to the cooling section 45, resulting in the specimen 5 being rapidly cooled through the cooling means. Thus, it will be noted that the illustrated embodiment satisfactorily accomplishes rapid heating and cooling of the phosphor as in the embodiments described above.

Figure 8:
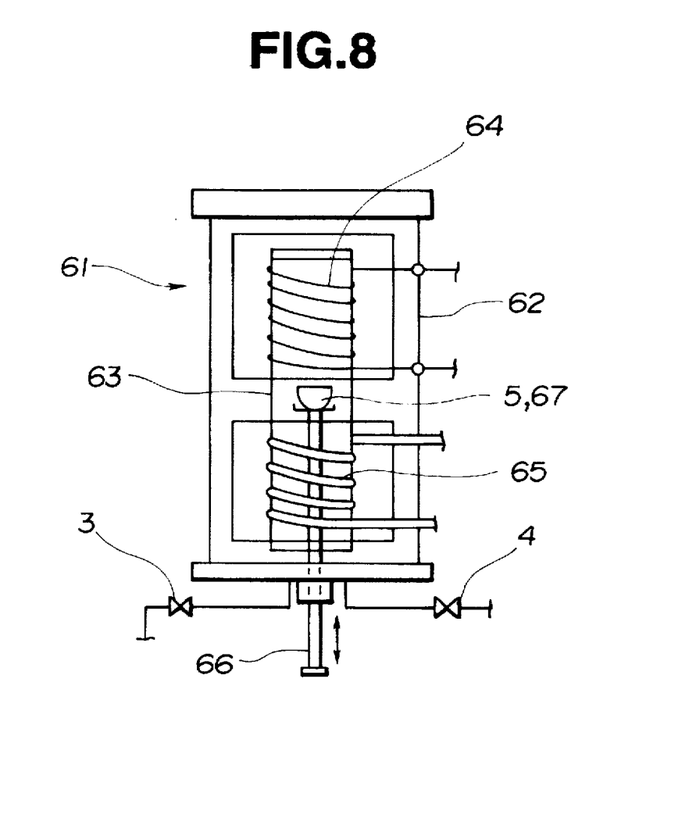
FIG. 8 is a front elevation view showing a fifth embodiment of a phosphor heat-treating apparatus according to the present invention.

Referring now to FIG. 8, a fifth embodiment of a phosphor heat-treating apparatus according to the present invention is illustrated, which is generally designated at reference numeral 61. The phosphor heat-treating apparatus 61 includes a cylindrical vessel 62 which is so arranged that an axis thereof extends in a vertical direction. The apparatus 61 also includes an evacuation unit 3 and an atmosphere gas feed unit 4 each connected to the vessel 62. In the vessel 62 is received a phosphor specimen 5 to be heat-treated.

The vessel 62 is provided therein with a core tube 63 of a cylindrical shape. The core tube 63 is closed at an upper end thereof and open at a lower end thereof. The core tube 63 has a heater 64 wound on an upper portion thereof so as to act as a heating means and a cooling coil 65 wound on a lower portion thereof so as to act as a cooling means. The apparatus 61 of the illustrated embodiment also includes a transfer means 66 for moving the specimen 5 in the vessel 62. The transfer means 66 is constructed so as to vertically move a tray 67 on which the phosphor specimen 5 is put in the core tube 63, to thereby selectively position the tray 67 in the heater 64 or the cooling coil 65.

In the illustrated embodiment constructed as described above, the phosphor specimen 5 is put on the tray 67 arranged in the vessel 62 and the vessel 62 is evacuated by means of the evacuation unit 3. Then, the vessel 62 is fed with atmosphere gas from the atmosphere gas feed unit 4, to thereby increase a pressure in the vessel 62 to a predetermined level. During the operation, the core tune 63 prevents any material possibly scattered in the vessel due to introduction of the atmosphere gas into the vessel from contaminating the specimen 5.

Then, the heater 64 is operated and the tray 67 is moved into the heater 64, resulting in the specimen 5 being rapidly heated. After the specimen 5 is heated for a predetermined or required period of time, the tray 67 is downwardly moved into the cooling coil 65, to thereby rapidly cool the specimen 5.

Figure 9:
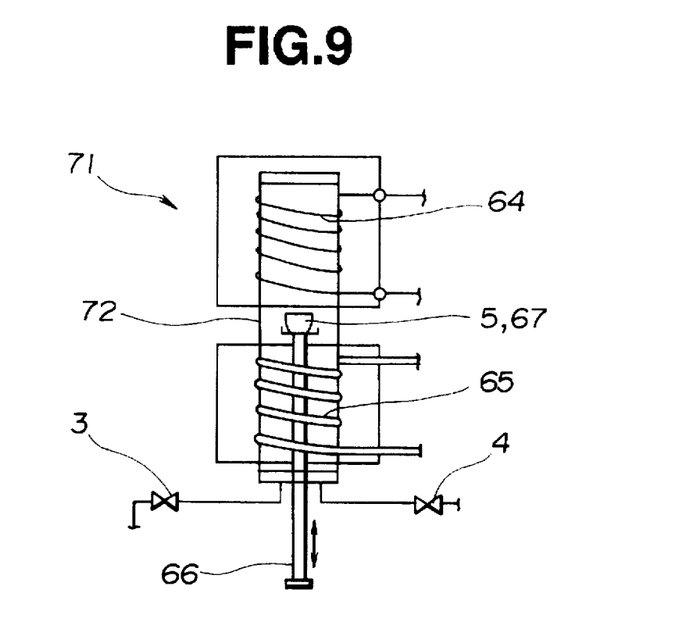
FIG. 9 is a front elevation view showing a sixth embodiment of a phosphor heat-treating apparatus according to the present invention.

Now, a sixth embodiment of a phosphor heat-treating apparatus according to the present invention will be described hereinafter with reference to FIG. 9. A phosphor heat-treating apparatus of the illustrated embodiment generally designated at reference number 71 includes a vessel 72 of a cylindrical configuration constructed so as to correspond to the core tube 63 of the phosphor heat-treating apparatus 61 described above with reference to FIG. 8. However, the vessel 72 is closed at a lower end thereof as well as an upper end thereof, to thereby be rendered airtight. The phosphor heat-treating apparatus 71 is adapted to be applied when a pressure in the vessel 72 formed by inert atmosphere gas fed thereto is set at a relatively low level. The remaining part of the illustrated embodiment may be constructed in substantially the same manner as the phosphor heat-treating apparatus 61 of FIG. 8.

As can be seen from the foregoing, the phosphor heat-treating method of the present invention is so constructed that a phosphor is heated and rapidly cooled in the atmosphere gas of a predetermined pressure. Such construction permits the pressure of the atmosphere gas to restrain decomposition and scattering of the phosphor while ensuring satisfactory crystallizability of the phosphor, to thereby increase a concentration of a luminous center in the phosphor, so that the phosphor may be highly improved in luminous characteristics.

Also, the phosphor heat-treating apparatus of the present invention is so constructed that atmosphere gas is introduced into the vessel in which a phosphor is received to set a predetermined pressure in the vessel, resulting in the phosphor being heated and then cooled under the pressure. Such construction permits the pressure of the atmosphere gas to restrain decomposition and scattering of the phosphor, to thereby increase a concentration of a luminous center in a luminous region on a surface of the phosphor while keeping crystallizability of the phosphor satisfactory. Thus, the apparatus of the present invention permits the phosphor to be provided with improved luminous characteristics.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A phosphor heat-treating apparatus, comprising:

a closed vessel constructed so as to hold atmosphere gas at a pressure of $5\times10^6$ to $1\times10^9$ Pa therein, said closed vessel having a heat-treating zone for heat-treating a phosphor received in said vessel, a cooling zone for cooling said phosphor, and means for introducing said atmosphere gas into said closed vessel and maintaining said atmosphere gas at said pressure;

a heating means for heating said phosphor received in said vessel in said heat-treating zone, said heating means being operatively positioned with said heat treating zone;

a processing means for rapidly cooling the heated phosphor in said cooling zone at a cooling speed of 100° C./sec or more, said processing means being operatively positioned with said cooling zone; and means for transferring said heated phosphor from said heating zone to said cooling zone for rapid cooling, said transferring means including a tray on which said phosphor is carried and a conveying device on which said tray is mounted, said conveying device being formed to alternatingly move said tray between one of said heat treating zone and said cooling zone.

2. A phosphor heat-treating apparatus as defined in claim 1, wherein said heating means is arranged outside said closed vessel.

3. A phosphor heat-treating apparatus as defined in claim 1, wherein said processing means is arranged outside said closed vessel.

4. A phosphor heat-treating apparatus as defined in claim 1, further comprising:

means for evacuating said closed vessel to a high vacuum.

5. A phosphor heat-treating apparatus as defined in claim 1, wherein said atmosphere gas introducing and maintaining means includes means for introducing a rare gas into said closed vessel.

6. A phosphor heat-treating apparatus as defined in claim 1, wherein said atmosphere gas introducing and maintaining means includes means for introducing into said closed vessel an atmosphere gas composed of a rare gas and a gas selected from the group consisting of $H_2$, $H_2S$, $O_2$ and $N_2$.

7. A phosphor heat-treating apparatus, comprising:

a closed vessel constructed so as to hold atmosphere gas at a pressure of $5\times10^6$ to $1\times10^9$ Pa therein, said closed vessel having means for introducing said atmosphere gas into said closed vessel and maintaining said atmosphere gas at said pressure and means for fixedly mounting a phosphor received therein;

heating means for heating said phosphor in said closed vessel, said heating means including a first drive means for alternatively moving said heating means between one of in and out of operative connection with said closed vessel; and processing means for rapidly cooling the heated phosphor in said closed vessel at a cooling speed of 100° C./sec or more, said processing means including a second drive means for alternatingly moving said processing means between one of in and out of operative connection with said closed vessel, wherein said heating means and said processing means are alternatingly moved relative to said closed vessel and to each other so as to alternatingly heat and then cool said phosphor, respectively, in said closed vessel.

8. A phosphor heat-treating apparatus as defined in claim 7, further comprising:

means for evacuating said closed vessel to a high vacuum.

9. A phosphor heat-treating apparatus as defined in claim 7, wherein said atmosphere gas introducing and maintaining means includes means for introducing a rare gas into said closed vessel.

10. A phosphor heat-treating apparatus as defined in claim 7, wherein said atmosphere gas introducing and maintaining means includes means for introducing into said closed vessel an atmosphere gas composed of a rare gas and a gas selected from the group consisting of $H_2$, $H_2S$, $O_2$ and $N_2$.

* * * * *